(12) United States Patent
Wei et al.

(10) Patent No.: US 7,683,121 B2
(45) Date of Patent: Mar. 23, 2010

(54) STABLE WET STRENGTH RESIN

(75) Inventors: Mingli Wei, Naperville, IL (US);
Vladimir A. Grigoriev, Chicago, IL (US); Gary S. Furman, Jr., St. Charles, IL (US); William J. Ward, Glen Ellyn, IL (US)

(73) Assignee: Nalco Company, Naperville, IL (US)

( * ) Notice: Subject to any disclaimer, the term of this patent is extended or adjusted under 35 U.S.C. 154(b) by 1395 days.

(21) Appl. No.: 11/091,176

(22) Filed: Mar. 28, 2005

(65) Prior Publication Data

US 2005/0217817 A1    Oct. 6, 2005

Related U.S. Application Data

(63) Continuation-in-part of application No. 10/818,269, filed on Apr. 5, 2004, now Pat. No. 7,291,695.

(51) Int. Cl.
*C08L 77/06* (2006.01)
*C08G 69/48* (2006.01)
*C08F 6/00* (2006.01)

(52) U.S. Cl. ............. 524/608; 524/538; 524/539; 524/606; 162/164.6

(58) Field of Classification Search ............. 524/538, 524/539, 606, 608; 525/430; 162/164.6
See application file for complete search history.

(56) References Cited

U.S. PATENT DOCUMENTS

| 3,197,472 | A | | 7/1965 | Schmalz |
| 4,853,431 | A | * | 8/1989 | Miller .................. 524/608 |
| 7,291,695 | B2 | * | 11/2007 | Wei et al. ............... 528/480 |

FOREIGN PATENT DOCUMENTS

| EP | 0320121 A2 | 6/1989 |
| EP | 0320121 A3 | 6/1989 |
| EP | 0469891 A1 * | 2/1992 |

* cited by examiner

*Primary Examiner*—Ana L Woodward
(74) *Attorney, Agent, or Firm*—Benjamin E. Carlsen; Michael B. Martin

(57) ABSTRACT

A method of stabilizing an aqueous solution of polyaminoamide-epichlorohydrin resin comprising sequentially adding to the solution about 0.1 to about 10 weight percent of one or more strong acids and about 0.1 to about 10 weight percent of one or more weak acids to prepare a stabilized solution having a pH of about 3-4.

22 Claims, 1 Drawing Sheet

STABLE WET STRENGTH RESIN

CROSS REFERENCE TO RELATED APPLICATIONS

This is a continuation-in-part of Ser. No. 10/818,269, filed Apr. 5, 2004 now U.S Pat. No. 7,291,695.

TECHNICAL FIELD

This invention is a method of stabilizing polyaminoamide-epichlorohydrin wet strength resins, especially at high solid levels. More specifically, the method involves sequentially adding a strong acid, a weak acid, and optionally additional strong acid to adjust the pH of the finished wet strength resin to about 3-4.

BACKGROUND OF THE INVENTION

Wet strength is the ability of paper to retain its integrity upon wetting. This property is critical for tissue, towel, napkin and other consumer products. A typical wet strength product in the marketplace is polyaminoamide-epichlorohydrin resin (PAE resin).

As polyaminoamide-epichlorohydrin resin is an active crosslinker, viscosity can build up and eventually gelling will occur, especially at conditions of prolonged storage time and high temperatures. The pH of final PAE resins is normally adjusted for suitable storage stability, but the higher the solid content, the lower the pH at which the resin must be maintained. However, there is a limit to which the pH value can be lowered since the PAE resin can be hydrolyzed once the pH is below a certain level.

Procedures for making PAE resins are well known in the literature. A polyaminoamide backbone is first prepared by reacting a polyalkylene polyamine and an aliphatic dicarboxylic acid or dicarboxylic acid derivative. A polyaminoamide made from diethylenetriamine and adipic acid or esters of dicarboxylic acid derivatives is most common. The polyaminoamide then reacts with epichlorohydrin in an aqueous solution. The product is diluted and neutralized to the desired solid content and pH range. Nearly all references involve the neutralization of the product with strong mineral acid such as sulfuric acid and hydrochloric acid to a pH below 3.0. The final products are kept at 10-25% concentration to avoid gellation.

A higher solid content is always desirable in the final product due to its lower cost of manufacturing, storage, transportation and application. But due to the decreased stability at higher solid content, wet strength resins are mostly kept at lower concentrations while the pH is adjusted below 3.0 with strong acid such as sulfuric acid and hydrochloric acid to avoid gellation. Two popular wet strength resins on the market are 12.5% KYMENE® 557 series from Hercules Incorporated, Wilmington, Del. and 25% AmRes® 25HP from Georgia-Pacific Resins Inc., Atlanta, Ga. Synthesis of a stable PAE resin of high solid content has remained a challenging task.

A process for stabilizing an aqueous polyamide-epichlorohydrin solution by adding a mixture of a weak acid and a strong acid to the aqueous solution is disclosed in EP0320121. In this process the majority of the acid is the weak acid (preferably formic acid). The preferred mole ratio of weak acid protons to strong acid protons (sulfuric acid) is about 3:1.

U.S. Pat. No. 3,197,427 discloses a process for stabilizing an aqueous polyamide-epichlorihydrin solution in which the pH of the solution is first adjusted to 3-4 with formic acid and is then adjusted to 2-3 with sulfuric acid.

SUMMARY OF THE INVENTION

We have discovered that when pH adjustment is done by sequential addition of specific amounts of a strong acid, a weak acid and optionally additional strong acid, the stability of the resin is greatly enhanced. Resins prepared as described herein exhibit excellent wet strength performance and enhanced gelling stability against industrial benchmark products.

Accordingly, this invention is a method of stabilizing an aqueous solution of polyaminoamide-epichlorohydrin resin comprising sequentially adding to the solution about 0.1 to about 10 weight percent of one or more strong acids and about 0.1 to about 10 weight percent of one or more weak acids to prepare a stabilized solution having a pH of about 3-4.

DETAILED DESCRIPTION OF THE INVENTION

Figure 1:
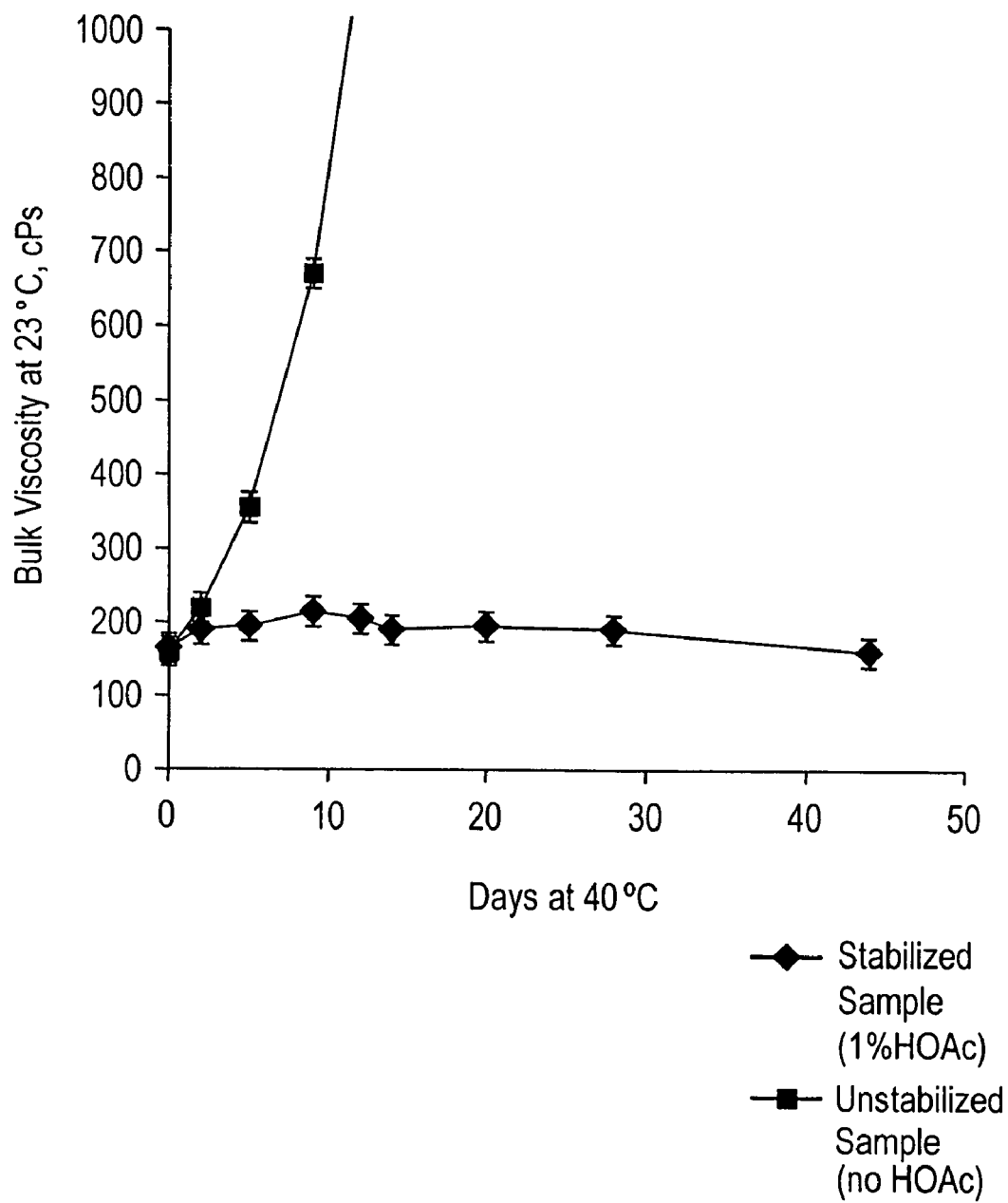
FIG. 1 is a plot of bulk viscosity vs. days at 40° C. for a representative stabilized polyaminoamide-epichlorohydrin resin prepared according to the method of this invention and an unstabilized sample.

Polyaminoamide-epichlorohydrin resins which can be stabilized according to this invention are water soluble, cationic thermosetting resins typically prepared by reacting one or more polyalkylene polyamines containing secondary amine groups and one or more dicarboxylic acid derivatives to form a polyaminoamide and then reacting the polyaminoamide with epichlorohydrin to form the polyaminoamide-epichlorohydrin resin.

The polyaminoamide backbone of the polyaminoamide-epichlorohydrin resin is generally made from the condensation polymerization of one or more organic dicarboxylic acid derivatives and one or more polyalkylene polyamines under conditions suitable for forming long-chain polyamides, preferably at temperatures higher than about 130° C. for several hours with removal of water or alcohol byproducts. The resulting polyaminoamide typically has molecular weight of about 500 to about 500,000 Daltons and a polymer Brookfield viscosity higher than about 100 cps for a 50% solution at 25° C. Water is added at end of the polymerization to make an aqueous polymer solution.

Generally, a sufficient amount of organic acid derivative to react with substantially all of the primary amino groups but insufficient to react to any significant degree with the secondary amino groups of the polyalkylene polyamine is used. The organic dicarboxylic acid derivative/polyalkylene polyamine molar ratio is preferably between about 0.9/1.0 to about 1.0/0.9.

"Organic dicarboxylic acid derivatives" includes aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyaminoamide is water soluble or water dispersible.

Representative organic dicarboxylic acids and their derivatives include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl, ethyl adipate dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl) ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthaic anhydride, and the like. DBE-2 dibasic ester, adipic acid, dimethyl glutarate and dimethyl adipate are preferred.

"Polyalkylene polyamines" means those organic compounds having two primary amine (—NH$_2$) groups and at least one secondary amine group where the amino nitrogen atoms are linked together by alkylene groups, provided no two nitrogen atoms are attached to the same carbon atoms. Representative polyalkylene polyamines include diethylenetriamine (DETA), triethylenetetraamine (TETA), tetraethylenepentaamine (TEPA), dipropylenetriamine, and the like. Diethylenetriamine is preferred.

In an embodiment, the organic dicarboxylic acid derivative is DBE-2 dibasic ester and the polyalkylene polyamine is diethylenetriamine.

In another embodiment, the organic dicarboxylic acid derivative is adipic acid and the polyalkylene polyamine is diethylenetriamine.

The polyaminoamide prepared as described above is then reacted with epichlorohydrin under controlled conditions to form the polyaminoamide-epichlorohydrin (PAE) resin. Preferably, the polyaminoamide is diluted with water to a concentration of about 10 to about 50 weight percent, and the solution is cooled below about 25° C. An amount of epichlorohydrin sufficient to react with substantially all of the secondary amino groups in the polyaminoamide is then slowly added in the solution so that the temperature is maintained below about 30° C. Typically, about 0.5 to about 1.8, preferably about 0.7 to about 1.5 molar equivalents of epichlorohydrin, based on secondary amino groups of the polyaminoamide, is sufficient to prepare a resin giving superior wet strength without undue problems with resin stability. The mixture is then heated at a temperature of about 40° C. to about 100° C. until desired viscosity is reached, typically about 2 to about 8 hours.

The polyaminoamide-epichlorohydrin resin solution is then quenched by adding about 0.1 to about 10 weight percent, based on total product weight, of one or more strong acids as defined herein.

"Strong acid" means an acid that almost completely dissociates to hydrogen ion and conjugate base in aqueous solution. Strong acids generally have a pKa less than about 2.2, preferably less than or equal to about 0. Representative strong acids include hydrochloric acid, sulfuric acid, phosphoric acid, nitric acid, perchloric acid and methanesulfonic acid.

Following the strong acid quench, from about 1 to about 10 weight percent of one or more weak acids as defined herein are then added to adjust the pH of the resin solution to about 3-4.

"Weak acid" means an acid that partly dissociates to hydrogen ion and its conjugate base in aqueous solution. Weak acids generally have a pKa greater than or equal to about 2.2. Representative weak acids include acetic acid, formic acid, lactic acid, benzoic acid, propionic acid, citric acid, malonic acid, adipic acid, malic acid, tartaric acid and glycine.

Accordingly, in an embodiment, this invention is a stabilized aqueous polyaminoamide-epichlorohydrin resin solution prepared by (a) reacting one or more aliphatic or aromatic dicarboxylic acid derivatives with one or more polyalkylene polyamines in a mole ratio of about 0.9:1 to about 1:0.9 to form a polyaminoamide;

(b) reacting an aqueous solution of the polyaminoamide prepared in step (a) with about 0.5 to about 1.8 molar equivalents of epichlorohydrin, based on secondary amino groups of the polyaminoamide, to form an aqueous polyaminoamide-epichlorohydrin resin solution;

(c) sequentially adding to the solution about 0.1 to about 10 weight percent of one or more strong acids and about 0.1 to about 10 weight percent of one or more weak acids to prepare a stabilized solution having a pH of about 3-4.

In another embodiment, the strong acid is selected from the group consisting of hydrochloric acid, sulfuric acid, phosphoric acid, nitric acid, perchloric acid and methanesulfonic acid.

In another embodiment, the weak acid is selected from the group consisting of acetic acid, formic acid, lactic acid, benzoic acid, propionic acid, citric acid, malonic acid, adipic acid, malic acid, tartaric acid and glycine.

In another embodiment, the stabilized aqueous solution comprises about 10 to about 50 weight percent of polyaminoamide-epichlorohydrin resin based on polymer solids.

In another embodiment, a first portion of the strong acid is added to the resin solution prior to the weak acid and a second portion of the strong acid is added to the resin solution after the weak acid such that a total of about 0.5 to about 10 weight percent of strong acid is added to the resin solution.

In another embodiment, the first strong acid portion comprises about 30 to about 90 percent of the strong acid and the second strong acid portion comprises about 70 to about 10 percent of the strong acid.

In another embodiment, the strong acid is selected from the group consisting of phosphoric acid, hydrochloric acid, sulfuric acid, nitric acid and perchloric acid and the weak acid is selected from the group consisting of acetic acid, formic acid, lactic acid, benzoic acid and propionic acid.

In another embodiment, about 0.5 to about 5 weight percent of strong acid and about 1 to about 5 weight percent of the weak acid is added to the resin solution.

In another embodiment, a first portion of the strong acid is added to the resin solution prior to the weak acid and a second portion of the strong acid is added to the resin solution after the weak acid such that a total of about 0.5 to about 5 weight percent of strong acid is added to the resin solution.

In another embodiment, the stabilized solution has a pH of about 3 to about 3.5.

In another embodiment, the strong acid is selected from the group consisting of phosphoric acid and sulfuric acid and the weak acid is selected from the group consisting of acetic acid, lactic acid and formic acid.

In another embodiment, the stabilized aqueous solution comprises about 25 to about 40 weight percent of polyaminoamide-epichlorohydrin resin based on polymer solids In another embodiment, the strong acid is phosphoric acid and the weak acid is formic acid.

In another embodiment, about 0.5 to about 4 weight percent of strong acid and about 1 to about 2.5 weight percent of the weak acid is added to the resin solution.

In another embodiment, a first portion of the strong acid is added to the resin solution prior to the weak acid and a second portion of the strong acid is added to the resin solution after the weak acid such that a total of about 0.5 to about 4 weight percent of strong acid is added to the resin solution.

In another embodiment, the stabilized solution has a pH of about 3 to about 3.3.

In another embodiment, the polyaminoamide-epichlorohydrin resin is prepared by reacting a polyaminoamide with about 0.7 to about 1.5 molar equivalents of epichlorohydrin, based on secondary amino groups of the polyaminoamide.

In another embodiment, the polyaminoamide-epichlorohydrin resin is prepared by reacting a polyaminoamide with about 1 to about 1.7 molar equivalents of epichlorohydrin, based on secondary amino groups of the polyaminoamide.

In another embodiment, the polyaminoamide is prepared by reacting one or more aliphatic or aromatic dicarboxylic acid derivatives with one or more polyalkylene polyamines in a mole ratio of about 0.9:1 to about 1:0.9.

In another embodiment, the dicarboxylic acid derivative is selected from DBE-2 dibasic ester, adipic acid, dimethyl glutarate and dimethyl adipate.

In another embodiment, the polyalkylene polyamine is diethylenetriamine.

In another embodiment, the dicarboxylic acid derivative is adipic acid and the polyalkylene polyamine is diethylenetriamine.

The stabilized polyaminoamide-epichlorohydrin resins prepared according to this invention may be incorporated into a papermaking process to enhance the wet strength of the paper prepared according to the process. As used herein "papermaking process" means a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art.

The stabilized aqueous polyaminoamide-epichlorohydrin resin may be incorporated into the papermaking furnish at any point on the wet end of the paper machine. They may also be applied from a tub size or at a size press or from showers to the dried or partially dried sheet. For most purposes, adequate wet strength may be obtained by incorporating in the paper from about 0.10 to about 3 weight percent of the resin, based on the dry weight of the pulp. However, in special cases, up to 5 weight percent or more of the resin may be used.

Accordingly, in another embodiment, this invention is a method of enhancing the wet strength of paper comprising adding to a papermaking furnish or paper sheet an effective wet strength enhancing amount of a stabilized aqueous solution of polyaminoamide-epichlorohydrin resin, wherein the aqueous solution is stabilized by sequentially adding to the solution about 0.1 to about 10 weight percent of one or more strong acids and about 0.1 to about 10 weight percent of one or more weak acids to prepare a stabilized solution having a pH of about 3-4.

The foregoing may be better understood by reference to the following examples, which are presented for purposes of illustration and are not intended to limit the scope of this invention.

EXAMPLE 1

To a 2000 ml reaction flask is charged 412.68 g of diethylenetriamine. The reactor is purged with nitrogen and the solution is heated to 150° C. and 654.12 g of DBE-2 (dibasic ester-2 from E.I. DuPont de Nemours and Company, Wilmington, Del.) is charged into the reactor over one hour while the temperature is maintained. Methanol begins to evolve after DBE-2 addition is started. The methanol is refluxed through a condenser. The reaction temperature begins to drop once methanol is formed. Reflux is maintained for half an hour after the completion of DBE-2 addition and then methanol is removed by distillation. The reaction temperature rises to 150° C. The reaction temperature is maintained at 150° C. for 5 hours. Water (810.7 g) is then slowly added into the reactor with stirring to provide a 50% polyaminoamide polymer solution.

EXAMPLE 2

To a 1000 ml reaction flask is charged 204.3 g of diethylenetriamine. The reactor is purged with nitrogen and 50 g of water, 4.0 g of sulfuric acid and 295.2 g of adipic acid are charged into the reactor while the mixture is heated to 165° C. Water is collected through a condenser. The reaction mixture is maintained at 165° C. for 5 hours. Optional vacuum is applied to increase polymer molecular weight. Water (423.5 g) is then slowly added into the reactor with stirring to provide a 50% polyaminoamide polymer solution.

EXAMPLE 3

To a 1500 ml reaction flask is charged 475.95 g the 50% aqueous polyaminoamide solution prepared in Example 2, and 362.72 g of water. The solution is mixed well and purged with nitrogen. The solution is cooled down to 15° C. and 162.48 g of epichlorohydrin is added into the reactor over one hour. The temperature is controlled below 20° C. After completion of epichlorohydrin addition, the reaction is allowed to proceed adiabatically for two hours. The reaction mixture is then heated to 45° C. and maintained at 45° C. for 4-8 hours. The reaction is quenched with about 26.4 g of sulfuric acid to bring the pH to about 2.1-2.5. About 12.0 g acetic acid (1.0% based on product) and 160 g water are added to make a final product with 34-36% polymer solids.

EXAMPLE 4

Wet strength resin samples prepared as in Example 3 (ca. 200 g) are placed in 8-oz jars supplied with lids. The samples are aged in a mechanical convection oven thermostated at 40° C. The bulk viscosity of the samples is monitored during aging time. The viscosity is measured using a Brookfield viscometer, LVT model, at 23° C. using a spindle #2 at 30 rpm. A plot of bulk viscosity vs. days at 40° C. for a representative stabilized polyaminoamide-epichlorohydrin resin prepared according to the method of this invention and an unstabilized sample is shown in FIG. 1. As shown in FIG. 1, there is virtually no viscosity build up in the stabilized sample upon extended storage at 40° C. while the unstabilized sample degrades within about 10 days.

EXAMPLE 5

Into a suitable reaction kettle is mixed 25.0 g of deionized water and 211.0 g of a 50% aqueous solution of a polyaminoamide prepared according to the method of Example 2. The polyamine backbone has a viscosity of 610 cps at 25° C.). This solution is mixed at ambient temperature until homogeneous. To this is added, over a period of 45 minutes, 59.5 g of epichlorohydrin. Stirring is continued during the addition and the temperature is maintained between 22-25° C. After the epichlorohydrin is all added, the mixture is warmed to 30° C. and held at this temperature for 2 hours with stirring. After this hold period, a second water addition, 194.3 g, is added and the reaction warmed to 55° C., and held at this temperature for 1.5 hours from the time the dilution water is added. After 1.5 hours the temperature is raised to 60° C. After 30 minutes, the temperature is again raised to 65° C., and the reaction is held (typically 30-60 minutes) at this temperature until the viscosity reaches 100 to 300 cps. When the proper viscosity is achieved, 5.0 g of phosphoric acid (85%) is added and the reaction is quickly cooled. During the cooling, 5.67 g of formic acid (88%) is also added. When the reaction reaches room temperature, the pH of the product is adjusted to about 3.0 using additional phosphoric acid (6.8 g). The resulting product is a clear amber material having a bulk viscosity of 130 cps, and a theoretical polymer actives value of 32%.

EXAMPLE 6

Into a suitable reaction kettle is mixed 219.0 g of deionized water and 211.0 grams of a 50% aqueous solution of a polyaminoamide prepared according to the method of Example 2. The polyamine backbone has a viscosity of 610 cps at 25° C. This solution is mixed at ambient temperature until homogeneous. To this is added, over a period of 45 minutes, 59.5 g of epichlorohydrin. Stirring is continued during the addition and the temperature is maintained between 22-25° C. After the epichlorohydrin is all added, the mixture is warmed to 30° C. and held at this temperature for 2 hours with stirring. After this hold period, the reaction warmed to 55° C. and held at this temperature for 1.5 hours. After 1.5 hours the temperature is raised to 60° C. After 30 minutes, the temperature is again raised to 65° C., and the reaction is held (typically 30-60 min.) at this temperature until the viscosity reaches 100 to 300 cps. When the proper viscosity is achieved, 6.0 g of phosphoric acid (85%) is added and the reaction is quickly cooled. During the cooling, 4.94 grams of glacial acetic acid is also added. When the reaction reaches room temperature, the pH of the product is adjusted to about 3.0 using additional phosphoric acid (9.07 g). The resulting product is a clear amber material having a bulk viscosity of 185 cps, and a theoretical polymer actives value of 32%.

EXAMPLE 7

Into a suitable reaction kettle is mixed 25.26 g of deionized water and 213.0 g of a 50% aqueous solution of a polyaminoamide prepared according to the method of Example 2. The polyamine backbone has a viscosity of 1040 cps at 25° C. This solution is mixed at ambient temperature until homogeneous. To this is added, over a period of 45 minutes, 60.12 g of epichlorohydrin. Stirring is continued during the addition and the temperature is maintained between 22-25° C. After the epichlorohydrin is all added, the mixture is warmed to 30° C. and held at this temperature for 2 hours with stirring. After this hold period, a second water addition, 196.34 g, is added and the reaction warmed to 55° C., and held at this temperature until the viscosity reaches 100 to 300 cps. The typical hold time is between 2-3 hours. When the proper viscosity is achieved, 5.05 g of phosphoric acid (85%) is added and quick cooling of the reaction is begun. During the cooling, 5.68 g of formic acid (88%) is also added. When the reaction reaches room temperature, the pH of the product is adjusted to about 3.4 using additional phosphoric acid (5.94 g). The resulting product is a clear amber material having a bulk viscosity of 287 cps, and a theoretical polymer actives value of 33%.

Examples 8-11 show the stability at ambient and elevated temperatures of polyaminoamide-epichlorohydrin resin solutions stabilized with various combinations of strong and weak acids.

Wet strength resin samples prepared as in Examples 5-7 (ca. 100 g) are placed in 4-oz jars supplied with lids. The samples are aged in a mechanical convection oven thermostated at 35° C. The bulk viscosity of the samples is monitored during aging time. The viscosity is measured using a Brookfield viscometer, DV-II+ model, equipped with a small sample cup, and water jacket. About 7-8 grams of sample are needed for a viscosity measurement. The measurements are performed at 25° C. using a water circulation bath, which is connected to the sample cup jacket. The spindle number is #18, using a speed of 12 RPM.

In Examples 8-11, wt. % acid refers to percent acid based on total product weight. Phosphoric acid is an 85% aqueous solution. Sulfuric, formic, acetic and lactic acids are concentrated (i.e. 100%). Percent polymer actives is based on the weight of backbone polyamine+total epichlorohydrin.

EXAMPLE 8

Tables 1 and 2 show the viscosity of polyaminoamide-epichlorohydrin resin solutions adjusted to pH 3 using phosphoric acid, phosphoric acid/formic acid and phosphoric acid/acetic acid at ambient temperature and 35° C.

As shown in Tables 1 and 2, resin solutions stabilized with phosphoric acid and weak acids such as formic and acetic acids having a pKa in the range from 3-5 are more stable than resin solutions prepared using strong acid alone. Formic acid provides improved stability compared to acetic acid. The inclusion of weak acids provides improved stability over strong acid alone.

TABLE 1

Viscosity of stabilized polyaminoamide-epichlorohydrin resin solutions at pH 3 and ambient temperature.

| Days | pH 3.0 32.7% actives 2.9 wt % $H_3PO_4$ | pH 3.0 32.5% actives 2.3 wt % $H_3PO_4$/1.1 wt % Formic Acid | pH 3.0 32.3% actives 3.0 wt % $H_3PO_4$/1.0 wt % Acetic Acid |
|---|---|---|---|
| 1 | 129 | 124 | 127 |
| 3 | 130 | 122 | 126 |
| 4 | 130 | 120 | 126 |
| 7 | 134 | 121 | 127 |
| 13 | 138 | 117 | 128 |
| 20 | 151 | 116 | 131 |
| 27 | 170 | 113 | 137 |
| 34 | 224 | 118 | 162 |

TABLE 2

Viscosity of stabilized polyaminoamide-epichlorohydrin resin solutions at pH 3 and 35° C.

| Days | pH 3.0 2.9 wt % $H_3PO_4$ | pH 3.0 2.3 wt % $H_3PO_4$/1.1 wt % Formic Acid | pH 3.0 3.0 wt % $H_3PO_4$/1.0 wt % Acetic Acid |
|---|---|---|---|
| 0 | 129 | 124 | 127 |
| 2 | 135 | 118 | 128 |
| 3 | 143 | 117 | 131 |
| 6 | 187 | 118 | 149 |
| 12 | 912 | 121 | 219 |
| 19 | Gelled | 132 | 486 |
| 26 | | 138 | Gelled |
| 33 | | 148 | |

EXAMPLE 9

Tables 3 and 4 show the Brookfield viscosity in centipoises of polyaminoamide-epichlorohydrin resin solutions adjusted to pH 3.0 to 3.8 using phosphoric acid/formic acid at ambient temperature and 35° C.

As shown in Tables 3 and 4, resin solutions stabilized with phosphoric acid/1% formic acid are most stable at pH 3.0-3.3.

TABLE 3

Viscosity of stabilized polyaminoamide-epichlorohydrin resin solutions at pH 3.0-3.8 and ambient temperature.

| Days | pH 3.0 32.3% Actives 3.1 wt % $H_3PO_4$/ 1.0 wt % formic acid | pH 3.3 32.5% Actives 2.5 wt % $H_3PO_4$/ 1.0 wt % formic acid | pH 3.5 32.6% Actives 2.0 wt % $H_3PO_4$/ 1.0 wt % formic acid | pH 3.8 32.9% Actives 1.3 wt % $H_3PO_4$/ 1.0 wt % formic acid |
|---|---|---|---|---|
| 0 | 200 | 200 | 200 | 200 |
| 1 | 196 | 200 | 197 | 196 |
| 2 | 208 | 203 | 211 | 210 |
| 5 | 207 | 217 | 223 | 247 |
| 6 | 208 | 220 | 220 | 262 |
| 7 | 191 | 209 | 223 | 269 |
| 14 | 191 | 232 | | |

TABLE 4

Viscosity of stabilized polyaminoamide-epichlorohydrin resin solutions at pH 3.0-3.8 at 35° C.

| Days | pH 3.0 32.3% Actives 3.1 wt % $H_3PO_4$/ 1.0 wt % formic acid | pH 3.3 32.5% Actives 2.5 wt % $H_3PO_4$/ 1.0 wt % formic acid | pH 3.5 32.6% Actives 2.0 wt % $H_3PO_4$/ 1.0 wt % formic acid | pH 3.8 32.8% Actives 1.3 wt % $H_3PO_4$/ 1.0 wt % formic acid |
|---|---|---|---|---|
| 0 | 200 | 200 | 200 | 200 |
| 1 | | | | |
| 2 | 200 | 198 | 223 | 246 |
| 5 | 180 | 227 | 275 | 510 |
| 6 | 189 | 232 | 304 | 812 |
| 7 | 187 | 246 | 352 | 1270 |
| 14 | 172 | 329 | | Gelled |

EXAMPLE 10

Tables 5 and 6 show the Brookfield viscosity in centipoises of polyaminoamide-epichlorohydrin resin solutions stabilized using phosphoric acid/formic acid mixtures at ambient temperature and 35° C.

As shown in Tables 5 and 6, resin solution stability increases with increased amounts of formic acid relative to phosphoric acid.

TABLE 5

Viscosity of polyaminoamide-epichlorohydrin resin solutions stabilized with phosphoric acid/formic acid mixtures at ambient temperature.

| Days | pH 3.2 2.7 wt % $H_3PO_4$/ 0.5 wt % formic acid 32.8% Actives | pH 3.2 2.4 wt % $H_3PO_4$/ 1.0 wt % formic acid 32.7% Actives | pH 3.2 1.3 wt % $H_3PO_4$/ 2.0 wt % formic acid 32.7% Actives | pH 3.2 all formic acid 32.6% Actives |
|---|---|---|---|---|
| 0 | | | | |
| 1 | 187 | 180 | 176 | 165 |
| 4 | 204 | 201 | 194 | 169 |
| 5 | 208 | 203 | 190 | 180 |
| 6 | 210 | 197 | 190 | 180 |
| 7 | 216 | 204 | 190 | 180 |
| 13 | 241 | 228 | 190 | 179 |

TABLE 6

Viscosity of polyaminoamide-epichlorohydrin resin solutions stabilized with phosphoric acid/formic acid mixtures at 35° C.

| Days | pH 3.2 2.7 wt % $H_3PO_4$/ 0.5 wt % formic acid 32.8% Actives | pH 3.2 2.4 wt % $H_3PO_4$/ 1.0 wt % formic acid 32.7% Actives | pH 3.2 1.3 wt % $H_3PO_4$/ 2.0 wt % formic acid 32.7% Actives | pH 3.2 all formic acid 32.6% Actives |
|---|---|---|---|---|
| 0 | | | | |
| 1 | | | | |
| 4 | 236 | 202 | | 180 |
| 5 | 253 | 223 | 199 | 190 |
| 6 | 250 | 227 | 201 | 178 |
| 7 | 301 | 241 | 193 | 179 |
| 13 | 588 | 288 | 202 | 181 |

EXAMPLE 11

Tables 6 and 7 show the Brookfield viscosity in centipoises of polyaminoamide-epichlorohydrin resin solutions stabilized using sulfuric acid/formic acid or sulfuric acid/lactic acid mixtures at ambient temperature and 35° C.

As shown in Tables 7 and 8, superior resin solution stability is achieved using formic acid.

TABLE 7

Viscosity of polyaminoamide-epichlorohydrin resin solutions stabilized with sulfuric acid/formic acid or sulfuric acid/lactic acid mixtures at ambient temperature.

| Days | pH 3.0 1 wt % $H_2SO_4$/ 1.0 wt % formic acid 33% Actives | pH 3.3 0.8 wt % $H_2SO_4$/ 1.0 wt % formic acid 33% Actives | pH 3.0 1.1 wt % $H_2SO_4$/ 1.0 wt % lactic acid 33% Actives | pH 3.3 1.0 wt % $H_2SO_4$/ 1.0 wt % lactic acid 33% Actives |
|---|---|---|---|---|
| 0 | | | | |
| 1 | 138 | 138 | 146 | 149 |
| 2 | 147 | 147 | 160 | 158 |
| 6 | 155 | 166 | 183 | 198 |
| 8 | 152 | 160 | 179 | 202 |

TABLE 8

Viscosity of polyaminoamide-epichlorohydrin resin solutions stabilized with sulfuric acid/formic acid or sulfuric acid/lactic acid mixtures at 35° C.

| Days | pH 3.0 1 wt % $H_2SO_4$/ 1.0 wt % formic acid 33% Actives | pH 3.3 0.8 wt % $H_2SO_4$/ 1.0 wt % formic acid 33% Actives | pH 3.0 1.1 wt % $H_2SO_4$/ 1.0 wt % lactic acid 33% Actives | pH 3.3 1.0 wt % $H_2SO_4$/ 1.0 wt % lactic acid 33% Actives |
|---|---|---|---|---|
| 0 | | | | |
| 1 | | | | |
| 2 | 144 | 152 | 162 | 176 |
| 6 | 164 | 187 | 274 | 458 |
| 7 | 163 | 202 | 345 | 774 |
| 8 | 166 | 218 | 449 | 3159 |

Changes can be made in the composition, operation and arrangement of the method of the invention described herein without departing from the concept and scope of the invention as defined in the claims.

The invention claimed is:

1. A method of stabilizing an aqueous solution of polyaminoamide-epichloro-hydrin resin comprising sequentially adding to the solution about 0.1 to about 10 weight percent of one or more strong acids and about 0.1 to about 10 weight percent of one or more weak acids to prepare a stabilized solution having a pH of about 3-4, wherein the added one or more strong acids quenches chemical reactions occurring within the polyaminoamide-epichlo-hydrin resin and wherein the strong acid is added after epichlorohydrin is added.

2. The method of claim 1 wherein the strong acid is selected from the group consisting of hydrochloric acid, sulfuric acid, phosphoric acid, nitric acid, perchloric acid and methanesulfonic acid.

3. The method of claim 1 wherein the weak acid is selected from the group consisting of acetic acid, formic acid, lactic acid, benzoic acid, propionic acid, citric acid, malonic acid, adipic acid, malic acid, tartaric acid and glycine.

4. The method of claim 1 wherein the stabilized aqueous solution comprises about 10 to about 50 weight percent of polyaminoamide-epichlorohydrin resin based on polymer solids.

5. The method of claim 4 wherein the polyaminoamide is prepared by reacting one or more aliphatic or aromatic dicarboxylic acid derivatives with one or more polyalkylene polyamines in a mole ratio of about 0.9:1 to about 1:0.9.

6. The method of claim 1 wherein a first portion of the strong acid is added to the resin solution prior to the weak acid and a second portion of the strong acid is added to the resin solution after the weak acid such that a total of about 0.5 to about 10 weight percent of strong acid is added to the resin solution.

7. The method of claim 6 wherein the first strong acid portion comprises about 30 to about 90 percent of the strong acid and the second strong acid portion comprises about 70 to about 10 percent of the strong acid.

8. The method of claim 1 wherein the strong acid is selected from the group consisting of phosphoric acid, hydrochloric acid, sulfuric acid, nitric acid and perchioric acid and the weak acid is selected from the group consisting of acetic acid, formic acid, lactic acid, benzoic acid and propionic acid.

9. The method of claim 8 wherein about 0.5 to about 5 weight percent of strong acid and about 1 to about 5 weight percent of the weak acid is added to the resin solution.

10. The method of claim 9 wherein a first portion of the strong acid is added to the resin solution prior to the weak acid and a second portion of the strong acid is added to the resin solution after the weak acid such that a total of about 1 to about 5 weight percent of strong acid is added to the resin solution.

11. The method of claim 9 wherein the stabilized solution has a pH of about 3 to about 3.5.

12. The method of claim 11 wherein the strong acid is selected from the group consisting of phosphoric acid and sulfuric acid and the weak acid is selected from the group consisting of acetic acid, lactic acid and formic acid.

13. The method of claim 1 wherein the stabilized aqueous solution comprises about 25 to about 40 weight percent of polyaminoamide-epichloro-hydrin resin based on polymer solids.

14. The method of claim 13 wherein the strong acid is phosphoric acid and the weak acid is formic acid.

15. The method of claim 14 wherein about 0.5 to about 4 weight percent of strong acid and about 1 to about 2.5 weight percent of the weak acid is added to the resin solution.

16. The method of claim 15 wherein a first portion of the strong acid is added to the resin solution prior to the weak acid and a second portion of the strong acid is added to the resin solution after the weak acid such that a total of about 0.5 to about 4 weight percent of strong acid is added to the resin solution.

17. The method of claim 15 wherein the stabilized solution has a pH of about 3 to about 3.3.

18. The method of claim 1 wherein the polyaminoamide-epichlorohydrin resin is prepared by reacting a polyaminoamide with about 0.5 to about 1.8 molar equivalents of epichlorohydrin, based on secondary amino groups of the polyaminoamide.

19. The method of claim 1 wherein the polyaminoamide-epichlorohydrin resin is prepared by reacting a polyaminoamide with about 0.7 to about 1.5 molar equivalents of epichlorohydrin, based on secondary amino groups of the polyaminoamide.

20. The method of claim 19 wherein the dicarboxylic acid derivative is selected from DBE-2 dibasic ester, adipic acid, dimethyl glutarate and dimethyl adipate.

21. The method of claim 19 wherein the polyalkylene polyamine is diethylenetriamine.

22. The method of claim 19 wherein the dicarboxylic acid derivative is adipic acid and the polyalkylene polyamine is diethylenetriamine.

* * * * *